O. J. HOBSON.
TIRE TREAD FOR PNEUMATIC TIRE CASINGS AND METHOD OF MAKING AND ATTACHING THE SAME.
APPLICATION FILED APR. 14, 1919.
1,327,912.                                                                 Patented Jan. 13, 1920.
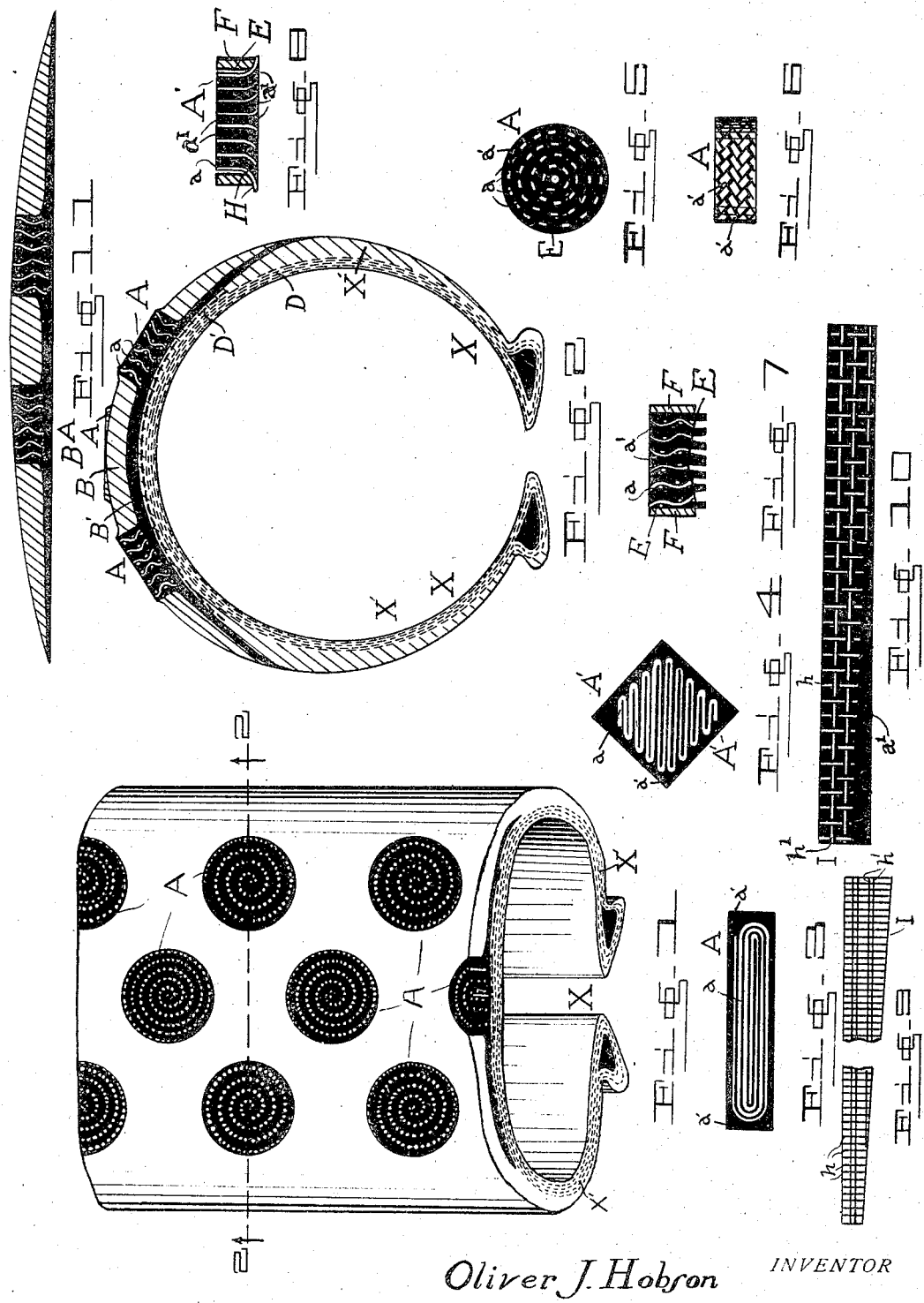
Oliver J. Hobson     INVENTOR
BY
Charles Turner Brown,
                     ATTORNEY

UNITED STATES PATENT OFFICE.

OLIVER J. HOBSON, OF CHICAGO, ILLINOIS, ASSIGNOR OF ONE-HALF TO OTTO Q. BECKWORTH, OF CHICAGO, ILLINOIS.

TIRE-TREAD FOR PNEUMATIC-TIRE CASINGS AND METHOD OF MAKING AND ATTACHING THE SAME.

1,327,912.                 Specification of Letters Patent.      Patented Jan. 13, 1920.

Application filed April 14, 1919. Serial No. 289,891.

*To all whom it may concern:*

Be it known that I, OLIVER J. HOBSON, a citizen of the United States, and a resident of Chicago, in the county of Cook and State of Illinois, have invented certain new and useful Improvements in Tire-Treads for Pneumatic-Tire Casings and Methods of Making and Attaching the Same, of which the following is a specification, regard being had to the drawing accompanying and forming a part hereof.

This invention relates to the tread of pneumatic tire casings; and objects of the invention are to obtain a tire tread having the characteristics hereinafter set forth which may be applied to a tire casing in the making thereof; and which may be applied after the casing has been used for a considerable time and is well worn.

Among additional objects of the invention is to obtain a tire tread provided with substantially non-resilient insets in the body thereof, so inserted and retained as to permit a comparatively free movement of said insets in said body, and so anchored as not to become removed or detached from said body, or their position therein normally changed, either by the deformation of the tread by the roadway, or by lateral motion of play imparted thereto by the travel thereof.

Additional objects are to obtain a construction of the tread which lessens the liability of its slipping either longitudinally or laterally of the roadway upon the application of brakes to the vehicle; to obtain a tread which is economically constructed; which is durable and highly deformable.

I obtain the above recited and additional objects hereinafter disclosed by building an inset in the manner hereinafter described, and attaching it in position in the tread, as an element thereof, and anchored to an additional element of the tread which comprises a layer of tenaciously elastic rubber; the body of the tread which comes in contact with the road or pavement being of firm and resilient rubber, adapted to yield and permit the several insets being forced into close contact with said road or pavement. Preferably a layer of tenaciously elastic rubber is interposed between the vertical peripheral wall of the insets and that portion or part of the tread adjacent thereto and in which said insets are embedded.

The insets applied and attached by me in the manner above outlined respectively comprise layers or folds of textile material alternating with and separated by layers or folds of tenaciously elastic rubber which are anchored by being vulcanized to and made integral with a layer or sheet of tenaciously elastic rubber which extends underneath the part of the tread in which said insets are embedded, as well as underneath said insets; to form an elastic element which is interposed between said part of the tread and said insets and the breaker strip of the casing.

In the drawing referred to Figure 1 is a perspective of a portion of a tire casing, one end of said portion being in cross section;

Fig. 2 is a cross section on line 2—2 of Fig. 1, viewed in the direction indicated by the arrows.

Fig. 3 is a plan of an inset member, comprising folded textile material, embedded in rubber.

Fig. 4 is a plan view of an inset member having a different contour line.

Fig. 5 is a plan of an inset member having a braided textile fabric embedded in rubber.

Fig. 6 is an elevation of the inset illustrated in Fig. 5.

Fig. 7 is a cross section of an inset the textile material whereof is wider at one end than at the other end thereof, partially completed; and Fig. 8 is a cross section of the inset which is illustrated in Fig. 7, fully completed, and having an annular flange at one end thereof.

Fig. 9 is a plan view of the textile material entering into the inset illustrated in Figs. 7 and 8; and Fig. 10 a plan of the textile material illustrated in Fig. 9, imposed on a strip of rubber, said strip of rubber forming an element of the inset illustrated in Figs. 7 and 8.

Fig. 11 is a cross section of a tread embodying this invention separated from the casing to which it is illustrated as joined in Figs. 1 and 2.

A reference character applied to designate a given part indicates said part throughout the several figures of the drawing, wherever the same appears.

X represents a portion of a pneumatic tire casing; X¹, X¹, being the sides thereof, adapted to resist a bursting strain, and B, B¹, the tread, which is adapted to resist said bursting strain and also to resist a wearing strain.

A, A¹, represent insets, which are illustrated in the drawing as extending from the back or under side of part B of the tread, through said part B to the front or road contacting face thereof. Insets A, A¹, are anchored to part B¹ of the tread, being, when the tread is completed and secured on the casing, vulcanized to said part B¹.

The construction of the insets A, A¹, comprises coils or folds $a, a$, of textile material, as canvas or the filling thereof, which are separated or spaced apart by rubber $a^1, a^1$.

Said rubber $a^1, a^1$, preferably, is gum rubber, it being necessary that after the vulcanizing which is required to complete the insets and the tread, and join them to the casing, said rubber element of the insets shall be tenaciously elastic.

D, D¹, are broken lines which indicate textile fabric which is embedded in the casing I; said fabric D¹ being termed the breaker strip of the casing.

The insets A, A¹, constructed as above set forth, are preferably embedded in part B of the tread, in the following manner:—A strip (B), of unvulcanized, or partially vulcanized rubber compound, adapted when fully vulcanized to be resilient, deformable and yieldingly firm, (that is, substantially like tire casing treads as heretofore constructed), said strip being of suitable width to make the tread of the casing desired, is provided with holes therethrough corresponding in size and number with the insets to be applied thereto. Referring, as above, to the face of said strip which will come in contact with the roadway when the tire casing of which it is an integral part is completed and applied to use, as the upper face thereof, and the face which comes in contact with and is an integral part of the tenaciously elastic rubber B¹, as the under face of said strip, said insets are preferably inserted in said holes from said under face of said strip. Inserting said insets in said strip from said under face thereof is particularly necessary when the flange about to be described is made thereon.

Said insets being position in said strip, and substantially embedded therein, a strip (B¹), consisting of what is known in the trade as commercially pure gum, (being the same material as the element $a^1$) of substantially the same size as the above named strip B, is joined thereto on the under face thereof.

In case said tread is to be immediately joined to and made an integral part of the casing, by pressure and vulcanizing, it is placed thereon adjacent to the breaker strip D¹, closely contacted thereto, as by rubbing in the ordinary way of applying treads to casings, and the casing is placed in a mold, and pressure and heat is applied thereto.

In case the tread is not to be immediately joined to the casing, in the manner last above set forth, said sheet or strip B¹ is protected on the exposed face thereof in the usual manner, as by oiled paper or cloth, or it is partially vulcanized.

To make the several insets integral with part B of the tread they are respectively provided with the circumferential wall E, which is made of said tenaciously elastic rubber, (after being fully vulcanized), and when it is desired said insets are not to be joined and made integral with said part B said wall E is omitted and a circumferential wall, F, of rubber compound is substituted therefor, at times; and at other times said wall E is retained and wall F is added thereto (as in Fig. 8).

The preferable way to make an inset which may be joined to and embedded in the tread of a casing, in the manner hereinbefore recited, is to take a sheet of textile material, as frictioned canvas, and a sheet of said gum, and after placing one on the other roll or fold said sheets. The gum will thereby be interposed between the coils or folds of the textile material; and said gum or said material, according to which one thereof is rolled or folded into the other, will form the circumferential, or peripheral wall thereof. The width of said sheets is immaterial, as the roll obtained may be cut into a plurality of insets, each thereof, when ready to be inserted in strip B, being of substantially the same length as the thickness of said sheet.

F, Figs. 7, 8, represents a peripheral wall of rubber compound, which is not adapted to vulcanize to part B of the tread; but is adapted to vulcanize to part $a^1$ of the insets. When the sheets of textile material and rubber gum are rolled or folded so that the peripheral wall thereof consists of said textile material the peripheral wall F is used to give the required movement of the insets in part B of the tread; and when said sheets are rolled or folded so that gum $a^1$ forms the peripheral wall of the insets obtained thereby, I prefer to add said wall F thereto, in case the side walls of the insets are not to be integral with the part B of the tread.

Fig. 9 represents a plan view of a strip of textile material which is wider at one end than at the other; and said strip is preferably used when the insets are individually made and flange H is desired. I represents said strip of textile material, and it will be observed that some of the warp threads thereof have been removed. The filling of said strip I is indicated by the letter $h$, and the warp thereof by the letter $h^1$. When said strip I is used it is rolled or folded so that the narrower end thereof is in the center of the inset made thereby, and before said inset is in condition to be applied to the strip B, as hereinbefore set forth, it is subjected to pressure, or to spinning, and flange H is obtained, at one end thereof, the top and bottom faces of the inset thereby being made parallel. A considerable increase in the area of the face of the inset which is anchored to part $B^1$ is obtained by means of flange H, and where the sides of the insets are not to be made integral with part B of the tread I prefer to obtain said flange, and to anchor it to said strip $B^1$.

The durability of a tire tread constructed as hereinbefore recited is in part due to the fact that the load is so received by the insets and transmitted therefrom to the casing as to very much lessen the lateral motion of part B of the tread as the same is forced into wearing contact with the road or highway.

When the entire tread is vulcanized to the casing the rubber of the insets and the strip ($B^1$) to which the insets are anchored, remain tenaciously elastic while the rubber compound B, (the wearing part of the tread), becomes firm and resilient, and being vulcanized under heavy pressure it is formed closely to and around said insets, thereby supporting them in an upright position. The rubber compound B of the tread, when properly vulcanized, not only supports the insets in proper position, but also returns them to that position when deflected laterally therefrom by the action of the tire travel, while the great elasticity of the anchor base ($B^1$), prevents the loosening of the insets when such lateral motion occurs.

The comparatively free motion allowed to the insets so distributes the strain thereon that they cannot be wrenched from their base. This occurs whether said insets are held in place and supported by a close fit of the part B around them, not vulcanized thereto, as well as when they are surrounded by a wall of rubber of sufficient elasticity, as described, after being vulcanized, to allow the necessary adjustment of the insets relative to the wearing tread, by the lateral movements thereof. The wearing tread being more yielding than the insets and the insets having comparatively free action through said wearing tread, when the load comes upon the tread and compresses it, said inset will tend to protrude through said tread, and in this way is forced firmly into contact with the pavement or roadbed.

It has previously been attempted to secure the well known non-skidding advantages of fabric by vulcanizing it into the composition forming the wearing body of the tread, but the lack of sufficient elasticity of said composition has caused the loosening of said insets to the extent that they could not be retained therein. This defect I thoroughly overcome by having the bases of the insets anchored on an elastic strip which allows the free lateral movement of the insets and retains them in position and attached to said elastic base, regardless of the motion imparted to them by the movement thereof in said wearing tread.

I claim:

1. Insets respectively consisting of a plurality of layers of textile material embedded in rubber adapted, when vulcanized, to be tenaciously elastic, in combination with a strip of rubber also adapted, when vulcanized, to be tenaciously elastic, and an additional strip of rubber compound adapted, when vulcanized, to be firm and resilient, said additional strip provided with holes and said insets in said holes and fitting closely to the walls thereof, said additional strip adapted to be vulcanized to said first named strip, and said first named strip adapted to be vulcanized to the rubber of said insets and, when applied thereto, to the adjacent face of a tire casing.

2. Insets respectively consisting of a plurality of layers of textile material embedded in rubber adapted, when vulcanized, to be tenaciously elastic, in combination with a strip of rubber also adapted, when vulcanized, to be tenaciously elastic, and an additional strip of rubber compound adapted, when vulcanized, to be firm and resilient, said additional strip provided with holes and said insets in said holes, the walls of said insets and said holes adapted, when vulcanized, to be integral, said additional strip adapted to be vulcanized to said first named strip, and said first named strip adapted to be vulcanized to said insets and, when applied thereto, to the adjacent face of a tire casing.

3. Insets respectively consisting of a plurality of layers of textile material held in spaced relation by interposed rubber and provided with annular rubber flanges at one of their respective ends, said interposed rubber and said rubber flanges adapted, when vulcanized, to be tenaciously elastic, in combination with a strip of rubber also adapted, when vulcanized, to be tenaciously elastic, and an additional strip of rubber compound adapted, when vulcanized, to be firm and resilient, said additional strip provided with holes and said insets in said holes and fitting closely to the walls thereof, said additional strip adapted to be vulcanized to said first named strip, and said first named strip adapted to be vulcanized to the rubber of said insets and, when applied thereto, to the adjacent face of a tire casing.

4. A tire tread consisting of a base strip adapted, when vulcanized, to be tenaciously elastic, insets on said base, said insets comprising textile material embedded in rubber and said rubber adapted, when vulcanized, to be tenaciously elastic and integral with said base strip, in combination with an additional strip of rubber compound, provided with holes, imposed on said first named strip with said insets in said holes, and said first named strip adapted to be vulcanized to said additional strip and to a pneumatic tire casing.

5. A tire tread consisting of a base strip, insets on said base, said insets consisting of textile material embedded in rubber, in combination with an additional strip of rubber compound imposed on said first named strip, said additional strip provided with holes and said insets in said holes, said first named strip and the rubber in said insets respectively adapted, when vulcanized, to be tenaciously elastic, said additional strip adapted, when vulcanized, to be resilient, and said strips adapted, when vulcanized, to be integral with the rubber in said insets and with each other, and said first named strip adapted, when applied thereto, to be vulcanized to and integral with the adjacent face of a tire casing.

6. The herein described method of making and attaching treads to pneumatic tire casings which consists in making an inset of layers of textile material separated by rubber adapted, when vulcanized, to be tenaciously elastic, providing a strip of rubber compound adapted, when vulcanized, to be firmly resilient, with holes corresponding in size and shape with the contour of said insets, inserting said insets in said holes with said layers at substantially right angles to the face of said strip, applying a strip of rubber corresponding to said first named strip to the back thereof, said last named strip adapted, when vulcanized, to be tenaciously elastic, applying said last named strip to a tire casing and vulcanizing the same thereto, under heat and pressure, to thereby integrally join said strips, and to join said last named strip to the base of said insets and to said casing.

OLIVER J. HOBSON.

Witnesses:
 OTTO Q. BECKWORTH,
 CHARLES TURNER BROWN.